United States Patent
Shu et al.

(10) Patent No.: US 9,255,732 B2
(45) Date of Patent: Feb. 9, 2016

(54) VACUUM HEAT PUMP CLOTHES DRYING METHOD AND DRYER

(75) Inventors: Hai Shu, Laoshan Qingdao (CN); Peishi Lv, Laoshan Qingdao (CN); Jindong Bing, Laoshan Qingdao (CN); Rongfeng Cheng, Laoshan Qingdao (CN)

(73) Assignees: HAIER GROUP CORPORATION, Laoshan Qingdao, Shandong (CN); QINGDAO HAIER WASHING MACHINE CO., LTD., Laoshan Qingdao, Shandong (CN)

( * ) Notice: Subject to any disclaimer, the term of this patent is extended or adjusted under 35 U.S.C. 154(b) by 411 days.

(21) Appl. No.: 13/822,884

(22) PCT Filed: Jun. 23, 2011

(86) PCT No.: PCT/CN2011/076206
§ 371 (c)(1),
(2), (4) Date: Mar. 13, 2013

(87) PCT Pub. No.: WO2012/034434
PCT Pub. Date: Mar. 22, 2012

(65) Prior Publication Data
US 2013/0180125 A1 Jul. 18, 2013

(30) Foreign Application Priority Data
Sep. 14, 2010 (CN) .......................... 2010 1 0282713

(51) Int. Cl.
*F26B 3/00* (2006.01)
*F26B 11/04* (2006.01)
*F26B 23/00* (2006.01)
*D06F 58/20* (2006.01)
*D06F 58/24* (2006.01)

(52) U.S. Cl.
CPC ................ *F26B 3/00* (2013.01); *D06F 58/206* (2013.01); *D06F 58/24* (2013.01); *F26B 11/049* (2013.01); *F26B 23/005* (2013.01); *Y02B 30/52* (2013.01)

(58) Field of Classification Search
CPC ..... D06F 58/206; D06F 58/24; F26B 11/049; F26B 23/005; F26B 3/00; Y02B 30/52
See application file for complete search history.

(56) References Cited

U.S. PATENT DOCUMENTS 5,806,204 A * 9/1998 Hoffman et al. .................. 34/92
7,055,262 B2 * 6/2006 Goldberg et al. ................. 34/86
(Continued)

FOREIGN PATENT DOCUMENTS

CN 1936160 A 3/2007
CN 101974843 A 2/2011
(Continued)

OTHER PUBLICATIONS

International Search Report (PCT/ISA/210) issued on Oct. 13, 2011, by the Chinese Patent Office as the International Searching Authority for International Application No. PCT/CN2011/076206.

*Primary Examiner* — Jiping Lu
(74) *Attorney, Agent, or Firm* — Buchanan Ingersoll & Rooney PC

(57) ABSTRACT

A dryer includes a sealed drum, a heat pump system, a vacuum device and a steam generating device. The steam generating device connects with the interior of the drum to introduce hot steam into the interior of the drum. The vacuum device connects with the interior of the drum. The heat pump system is arranged external to the drum. Heat generated by the heat pump device is exchanged with the outer surface of the drum through a liquid medium so as to heat the wet clothes in the drum. Simultaneously, damp-hot air mixed with the water vapor in pumped from heating clothes in the drum by the vacuum device and the hot steam pumped into the drum and contacted with clothes are cooled and condensed into water. The water produced by damp-hot air is connected with water provided by the steam generating device.

7 Claims, 2 Drawing Sheets

(56) References Cited

U.S. PATENT DOCUMENTS

2006/0277690 A1* 12/2006 Pyo et al. .................. 8/149.2
2009/0139277 A1* 6/2009 Park et al. .................. 68/5 C

FOREIGN PATENT DOCUMENTS

| JP | 61-187897 A | 8/1986 |
| JP | 8-280994 A | 10/1996 |

* cited by examiner

VACUUM HEAT PUMP CLOTHES DRYING METHOD AND DRYER

FIELD OF THE INVENTION

The invention relates to a clothes drying method and a dryer, particularly, a method for drying clothes quickly in near-vacuum state and a vacuum heat pump dryer.

BACKGROUND OF THE INVENTION

In the drying mechanism for clothes dryer or laundry dryer, the device for generating heated air uses the heater to heating the air mostly. The existing electric dryer generally uses the heating wire or heating pipe as the heat source, but such products are high energy consumption, long drying time and poor safety. In order to reduce energy consumption, a heat pump dryer is developed, the heat pump system is used to strengthen the heat recycling, improve the utilization efficiency of energy, reduce the consumption of electric energy.

The air circulation channel installed in the heat pump clothes drying device is as follows: the heat air heated by the condenser in the heat pump circulatory system is passed into the drying chamber with clothes, then the hygroscopic air captured the water from the clothes is passed to the evaporator for dehumidification, and then the dehumidified air is heated again by the condenser and passed to the drying chamber.

Energy consumption of the heat pump dryer as mentioned above decreased, however, the drying speed does not be increased, the clothes drying time is still long, generally drying 7-8 kg clothes needs 2-3 hours. In order to remove the water of clothes within a short of time, people take a variety of ways to achieve this purpose, the method used in the dryer is drying at higher temperatures, strengthening the air circulation of surface, increasing the evaporation area. Although these methods is used, the energy consumption and the time of drying process is still higher. Furthermore, drying the clothes in higher temperature may damage the fabric itself, and be prone to wrinkling and shrinking.

The Chinese patent with the application number of 200610153406.9 discloses a clothing dryer which permits a stable operation of a heat pump generating drying air to be circulated between a drying chamber and the heat pump. An air circulation route is formed which delivers air heated by a heater of a heat pump unit to a water tank to be a drying chamber, returns the air discharged from the water tank to the heat pump unit through a filter unit, dehumidifies in a heat absorber and delivers again to the heater. The filter unit is provided with a lint filter and a duct communicating with an air outlet and an air introduction opening is formed.

The drying speed of the above drying device is still not improved, and the time of drying process is still long.

So, the present invention is proposed.

SUMMARY OF THE INVENTION

The object of the present invention is to overcome the disadvantages of the prior art, to provide a method of clothes drying using vacuum heat pump that can reduce the drying energy consumption, speed up the drying speed.

Another object of the present invention is to provide a vacuum pump dryer that using a heat pump system, a device for generating steam and a vacuum device to improve the drying efficiency.

In order to solve the above technical problem, the following technical solution is used:

A method for drying clothes using vacuum heat pump, the clothes are placed in a sealed drum, the internal atmospheric pressure of the drum becomes small until close to the vacuum state through the vacuum system, at the same time, the heat pump system heats the surface of the drum, the clothes reach evaporation temperature of moisture by contact of the clothes and the inner surface of drum, the water of clothes evaporate to form water vapor which is taken away by the vacuum.

In the process of the drying clothes, the hot steam is passed into the drum to increase heat convection between the inner surface of drum and the clothes in order to rapid dry clothes in the process of drying clothes, the damp-hot air mixed with the water vapor produced by heating clothes and the hot steam pumped into the drum and contacted with clothes are pumped out through the vacuum extraction and condensed into water by the heat pump system.

The drum surface is heated through liquid medium using the quantity of heat, which is produced through that the refrigerant is compressed by the heat pump system, then, the refrigerant with low temperature and low pressure exchange heat with the damp-hot air, the damp-hot air is cooled and condensed into condensation water, collecting condensation water, and a part of which is heated into hot steam and sent into the drum.

The lower part of the drum is immersed in the liquid medium heated by the heat pump system, the temperature of the liquid medium can keep at a 35 to 60° C., the temperature of the drum surface is of 35~55° C., and the temperature within the drum is of 30~50° C.

A vacuum heat pump clothes dryer of present invention includes an outer tub, a driving device, a control device, wherein said dryer also includes a sealed drum, a heat pump system, a vacuum device and a steam generating device, the steam generating device connects with the interior of the drum to let the hot steam come into the interior of the drum, the vacuum device connects with the interior of the drum to vacuumize, the heat pump system is arranged in the drum external, the heat generated by the heat pump device is exchanged to the outer surface of the drum through a liquid medium so as to heat the wet clothes in the drum, simultaneously damp-hot air mixed with the water vapor pumped from heating clothes in drum by a vacuum device and the hot steam pumped into the drum and contacted with clothes are cooled and condensed into water, the water produced by damp-hot air is connected with water provided by the steam generating device.

Said heat pump system includes a compressor, a condenser, a throttling device and a evaporator, a circulatory system is formed through that the refrigerant circulating pipeline connects the compressor, the condenser, the throttling device, the evaporator and the compressor to refrigerant circulating pipeline in turn, the refrigerant with high temperature and high pressure produced by compressing is transferred to the condenser and releases heat through condenser, which is used for heat the surface of the drum, then the refrigerant is adjusted by the throttling device to become the gas of low temperature and low pressure, and the gas of low temperature and low pressure passes the evaporator 6 and exchanges heat with the damp-hot air pumped by the vacuum device in the evaporator, simultaneously the damp-hot air is cooled and condensed into water.

Said drum is arranged inside the outer tub rotationally, there is space for the liquid medium between lower part of the drum and the outer tub, the heat released by the heat pump system is absorbed through the circulating water system, the circulating water system let the liquid medium circulate in the condenser and liquid media space through the circulating water pipeline and the pump to make the heat exchange.

Said drum is arranged inside the outer tub rotationally, there is space for the liquid medium between lower part of the drum and the outer tub, and the liquid medium space is full of liquid medium, the condenser of the heat pump system is arranged in the liquid medium space to release the heat to the liquid medium directly.

Said the vacuum device includes an injector for pumping negative pressure, an centrifugal pump and a catchment device, a circulatory waterway is formed through the centrifugal pump connects the injector and the catchment device to centrifugal pump in turn, the vacuum device includes a vacuum pipe too, one end of the vacuum pipe is connected with the drum, the other end through the evaporator is connected with the injector.

Said injector is venturi tube, the side of venturi tube outlet connects with the vacuum pipe, the circulatory waterway formed through that the centrifugal pump connects the injector, the catchment device to the centrifugal pump in turn that pumps the air and the water in the pipe connecting with the evaporator by the injector, and the other end of that pipe connecting with the evaporator connects with the drum seally to extract the gas in the drum to let the pressure in the drum become smaller and close to vacuum, under vacuum condition, the saturated damp-hot air in the drum is cooled and condensed into water through the evaporator of the vacuum pipe, the water is collected to the catchment device.

Said steam generating device is connected with the drum and the catchment device respectively, the part of the water in the catchment device is circulated in the circulatory waterway, the part is passed to the steam generating device, and the remaining part is drained.

Using the above technical project, the present invention has the following beneficial effects compared to prior art.

When the vacuum heat pump dryer working, put the clothes into the drum and close the door of dryer to seal the drum completely, the motor drives the drum to rotate through a belt to flip the clothes in the drum, so as to shake the clothes loose and speed up the drying, the air and the steam in the drum is pumped by the vacuum device so that there is near-vacuum state in the drum and the atmospheric pressure in the drum can keep in $0.03*10^5 \sim 0.1*10^5$ Pa. The heat pump system will generate heat and transfer the heat to the liquid medium between the drum and the outer tub, so as to heat the drum indirectly, the gas of low temperature and low pressure exchanges heat with damp-hot air pumped by a vacuum device in the evaporator and absorbs heat from damp-hot air, the damp-hot air is cooled and condensed into water.

Under the different atmospheric pressure, there are different boiling point of water, the steam saturated temperature and the boiling point will reduce with the pressure. In the present invention, the dryer uses a heat pump system, a vacuum device and the steam generating device can accelerate the drying speed and reduce energy consumption further more, Under the action of the vacuum device, the atmospheric pressure in the drum will be close to vacuum state, under such conditions, the boiling point of water will greatly reduce. Therefore, the water can reach boiling and be evaporated rapid under the lower temperature, so that it is realized of drying the clothes in a low temperature and reducing the damage of the clothes; the heat pump system can provide heat to heat the drum, and recover the heat of the damp-hot mixture air and condense it into water, which can improve the utilization efficiency of heat exchange and reduce energy consumption; injecting hot steam to the drum under the condition of vacuum and heating can improve the heat exchange of the clothes in the drum, protect the clothes, improve the safety of dryer and eliminate the fire hazards.

The invention will now be described further with reference to a non-limiting specific embodiment as shown in the drawings.

DETAILED DESCRIPTION OF PREFERRED EXAMPLES

Figure 1:
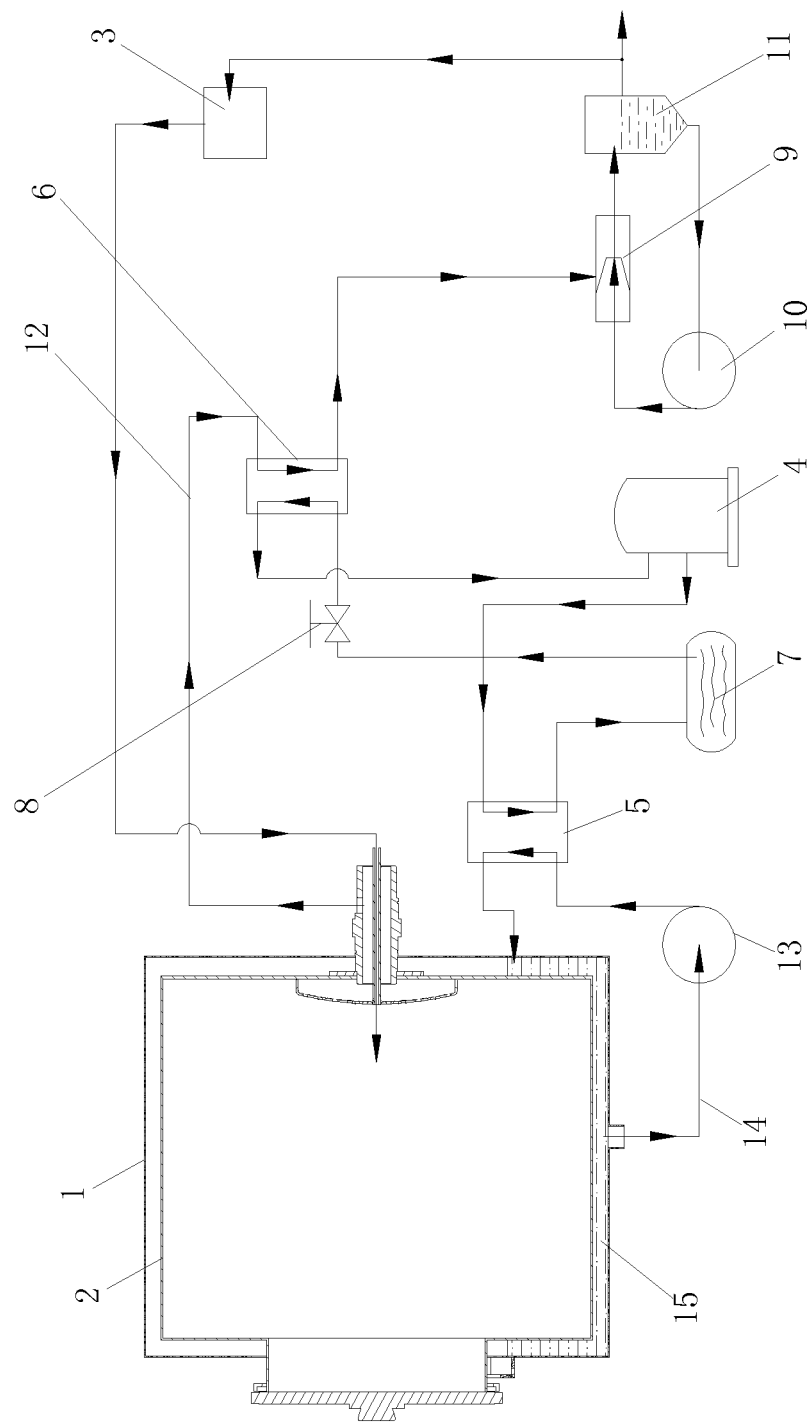
FIG. 1 shows a schematic illustration for the connection relationship of the vacuum heat pump dryer structure of the present invention

Drying clothes is removing the water in clothes finally, in order to remove the water in the clothes in a short time, various methods are taken to achieve this objective, the method of dryer is increasing the temperature, strengthening air circulation of the surface, increasing the evaporation area and so on. In different atmospheric pressure, the boiling point of water is different, the boiling point reduce with the atmospheric pressure. The relationship of the boiling point and the atmospheric pressure is as follows:

| Pressure ($*10^5$ Pa) | Boiling point (° C.) |
|---|---|
| 1.01 | 100 |
| 0.846 | 95 |
| 0.71 | 90 |
| 0.58 | 85 |
| 0.44 | 80 |
| 0.436 | 78 |
| 0.36 | 75 |
| 0.31 | 70 |
| 0.268 | 67 |
| 0.2 | 60.05 |
| 0.18 | 57.8 |
| 0.13 | 51.034 |
| 0.1 | 45.8 |
| 0.09 | 41.5 |
| 0.07 | 39 |
| 0.06 | 36.159 |
| 0.05 | 32.874 |
| 0.04 | 28.96 |
| 0.03 | 24.079 |
| 0.02 | 17.495 |
| 0.01 | 6.9696 |

From the data in the table, the water can boil at 24° C.~45.8° C. in the 0.03 * 105~0.1 * 105 Pa atmospheric pressure, that is, when the atmospheric pressure is sufficiently low, the water can reach the boiling point in the lower temperature, even in the room temperature, so it can be achieved that the water is evaporated rapid at lower temperatures.

The ideal vacuum, namely the absolute vacuum, it does not exist. In general there has a small amount of gas in vacuum, so there has a atmospheric pressure in vacuum. The vacuum in real life is generally of very thin atmosphere, so the vacuum state of man-made is of atmospheric pressure, rather than absolute zero pressure.

The present invention adopts a drying clothes method by a vacuum pump, the clothes are placed in a sealed drum, the internal atmospheric pressure of the drum becomes small until close to the vacuum state through the vacuum system, at the same time, the heat pump system heats the surface of the drum, the clothes reach evaporation temperature of moisture by contact of the clothes and the inner surface of drum, the water of clothes evaporate to form water vapor which is taken away by the vacuum. The hot steam is passed into the drum to increase heat convection between the inner surface of drum and the clothes in order to rapid dry clothes in the process of drying clothes. In the process of the drying clothes in drum, the damp-hot air mixed with the water vapor produced by heating clothes and the hot steam pumped into the drum and contacted with clothes are pumped out through the vacuum extraction and condensed into water by the heat pump system. The drum surface is heated through liquid medium using the quantity of heat, which is produced through that the refrigerant is compressed by the heat pump system, then, the refrigerant with low temperature and low pressure exchange heat with the damp-hot air, the damp-hot air is cooled and condensed into condensation water, collecting condensation water, and a part of which is heated into hot steam and sent into the drum.

The drying method in the present invention is using the relationship between the boiling point of water and atmospheric pressure, Under the lower atmospheric pressure, the water can boil in the lower temperature, extracting the steam can achieve the purpose of rapid drying. Drying clothes is in a low-temperature, thereby it is overcoming problem that the high temperature damages the clothes.

As shown in FIG. 1, the vacuum heat pump clothes dryer of present invention includes an outer tub 1, a driving device, a control device, said dryer also includes a sealed drum 2, a heat pump system, a vacuum device and a steam generating device 3, the steam generating device 3 connects with the interior of the drum to let the hot steam come into the interior of the drum, the vacuum device connects with the interior of the drum to vacuumize, the heat pump system is arranged in the drum external, the heat generated by the heat pump device is exchanged to the outer surface of the drum through a liquid medium so as to heat the wet clothes in the drum, simultaneously damp-hot air mixed with the water vapor pumped from heating clothes in drum by a vacuum device and the hot steam pumped into the drum and contacted with clothes are cooled and condensed into water, the water produced by damp-hot air is connected with water provided by the steam generating device.

Said heat pump system includes a compressor 4, a condenser 5, a throttling device and a evaporator 6, the throttling device includes a refrigerant bottles 7 and a regulating valve 8, a circulatory system is formed through that the refrigerant circulating pipeline connects the compressor, the condenser, the throttling device, the evaporator and the compressor to refrigerant circulating pipeline in turn.

The vacuum device using the theory of Bernoulli's equation, which is a basic law in fluid mechanics, includes an injector for pumping negative pressure 9, an centrifugal pump 10 and a catchment device 11, a circulatory waterway is formed through the centrifugal pump 10 connects the injector 9 and the catchment device 11 to centrifugal pump 10 in turn, the vacuum device includes a vacuum pipe 12 too, one end of the vacuum pipe is connected with the drum 2, the other end through the evaporator 6 is connected with the injector 9.

Said injector 9 is venturi tube, the side of venturi tube outlet connects with the vacuum pipe 12, the circulatory waterway formed through that the centrifugal pump 10 connects the injector 9, the catchment device 11 to the centrifugal pump 10 in turn that pumps the air and the water in the pipe connecting with the evaporator by the injector, and the other end of that pipe connecting with the evaporator 6 connects with the drum 2 seally to extract the gas in the drum to let the pressure in the drum become smaller and close to vacuum, under vacuum condition, the saturated damp-hot air in the drum is cooled and condensed into water through the evaporator 6 of the vacuum pipe 12, the water is collected to the catchment device 11.

Said steam generating device 3 is connected with the drum 2 and the catchment device 11 respectively, the part of the water in the catchment device 11 is circulated in the circulatory waterway, the part is passed to the steam generating device 3, and the remaining part is drained.

The refrigerant with high temperature and high pressure produced by compressing of compressor 4 is transferred to the condenser 5 and releases heat through condenser 5, which is used for heat the surface of the drum, then the refrigerant is adjusted by a refrigerant bottles 7 and a regulating valve 8 to become the gas of low temperature and low pressure, and the gas of low temperature and low pressure passes the evaporator 6 and exchanges heat with the damp-hot air pumped by the vacuum device in the evaporator 6, simultaneously the damp-hot air is cooled and condensed into water.

Said drum 2 is arranged inside the outer tub 1 rotationally, there is space 15 for the liquid medium between lower part of the drum 2 and the outer tub 1, the heat released by the heat pump system is absorbed through the circulating water system, the circulating water system let the liquid medium circulate in the condenser 5 and liquid media space 15 through the circulating water pipeline 14 and the pump 13 to make the heat exchange. Specifically, the circulating water pipeline 14 from the outlet below the liquid medium space 15 to the inlet above the liquid medium space 15 pass the pump 13 and the condenser 5 in turn.

The lower part of the drum is immersed in the liquid medium heated by the heat pump system, the temperature of the liquid medium can keep at a 35 to 60° C., the temperature of the drum surface is of 35~55° C., and the temperature within the drum is of 30~50° C.

Figure 2:
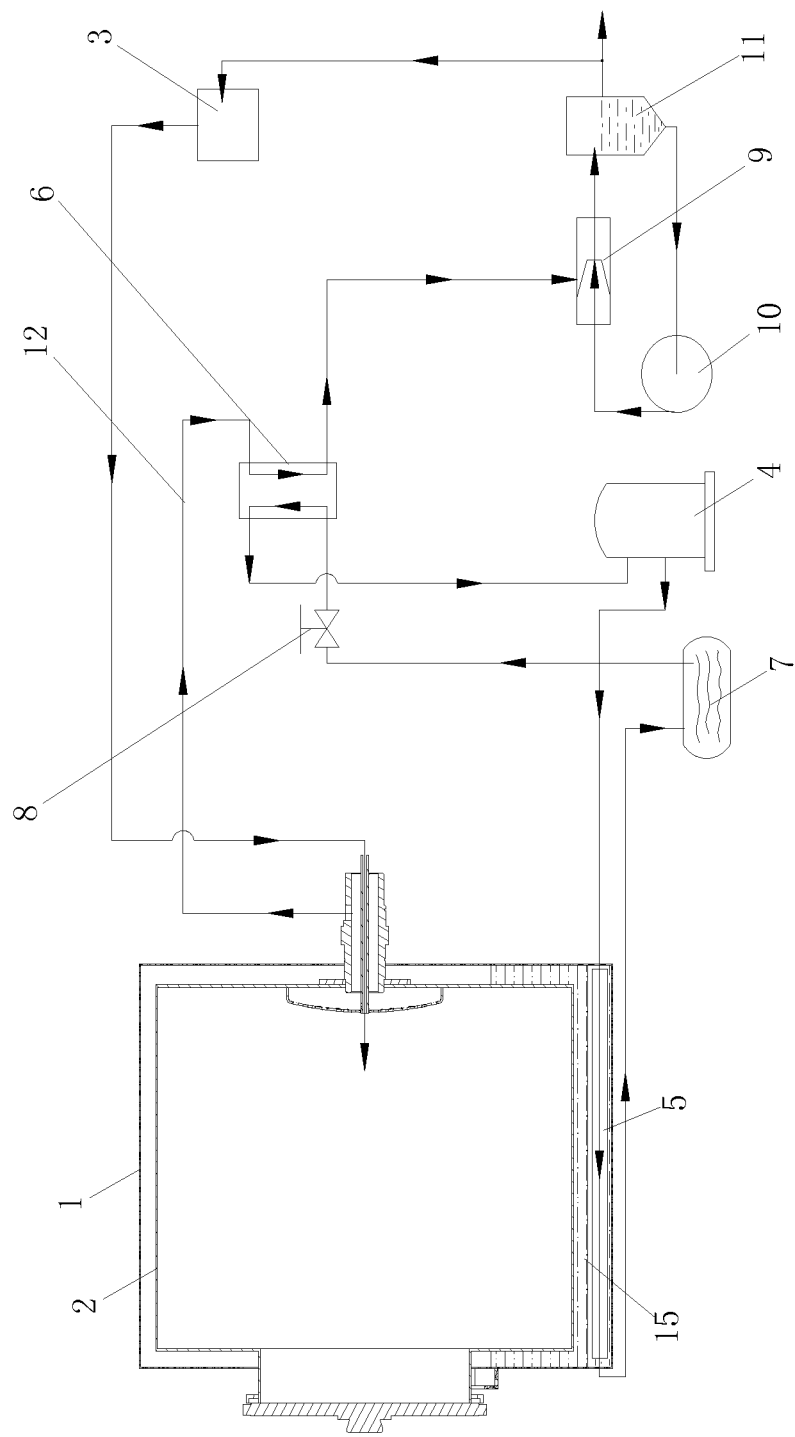
FIG. 2 shows a schematic illustration for the connection relationship of the vacuum heat pump dryer structure of another exemplary embodiment in present invention

As shown in FIG. 2, compared with the above described example, the differences of the present example is the mode of heat transfer that the surface of the drum is heated using the heat pump system, the above described example exchange the heat by the circulating water system. the present example direct transfer heat to the liquid medium using condenser, which can reduce the heat loss, so the temperature of the interior of the drum can enhance 2-5° C. than the above described example.

Specifically, the liquid medium space 15 between the bottom of the drum 2 and the outer tub 1 is full of liquid medium, the condenser 5 of the heat pump system is arranged in the liquid medium space 15, the heat released by the condenser 5 heat the liquid medium directly, it reduces the loss of heat transfer because the circulating water system isn't adopted in heat transfer relative to the above-described structure.

In the present invention, the dryer uses a heat pump system, a vacuum device and the steam generating device can accelerate the drying speed and reduce energy consumption further more, Under the action of the vacuum device, the atmospheric pressure in the drum will be close to vacuum state, under such conditions, the boiling point of water will greatly reduce. Therefore, the water can reach boiling and be evaporated rapid under the lower temperature, so that it is realized of drying the clothes in a low temperature and reducing the damage of the clothes; the heat pump system can provide heat to heat the drum, and recover the heat of the damp-hot mixture air and condense it into water, which can improve the utilization efficiency of heat exchange and reduce energy consumption; injecting hot steam to the drum under the condition of vacuum and heating can improve the heat exchange of the clothes in the drum and protect the clothes.

The structure above is just described preferable example of the invention, not to limit the conception and scope of the invention. In the premise of the design idea, the various changes and improvements that are made by those skilled in the art are in the scope of the invention.

The invention claimed is:

1. A method for drying clothes using a vacuum heat pump, the method comprising:
   placing the clothes in a sealed drum;
   reducing the internal atmospheric pressure of the drum until close to a vacuum state through a vacuum system;
   heating the surface of the drum by a heat pump system, through a liquid medium using heat which is produced by compressing a refrigerant by the heat pump system, so that the clothes reach evaporation temperature of moisture by contact of the clothes with the inner surface of the drum, and the water of the clothes evaporates to form water vapor which is extracted by the vacuum,
   exchanging heat between the refrigerant with low temperature and low pressure and damp-hot air, to cool and condense the damp-hot air into condensation water, collecting the condensation water, and heating a part of the condensation water into hot steam and send the part of the condensation water into the drum,
   immersing a lower part of the drum in the liquid medium, and
   maintaining the temperature of the liquid medium in a range of 35 to 60° C., the temperature of the drum surface in a range of 35-55° C., and the temperature within the drum in a range of 30-50° C., by heat generated during operating of the heat pump system.

2. A method for drying clothes using a vacuum heat pump according to claim 1, comprising:
   in the process of drying the clothes, passing the hot steam into the drum while in the vacuum state to increase heat convection between the inner surface of drum and the clothes in order to rapidly dry the clothes, and
   pumping out the damp-hot air mixed with the water vapor produced by heating clothes and the hot steam pumped into the drum and contacted with clothes through the vacuum extraction, and condensing the damp-hot air mixed with the water vapor produced by heating clothes and the hot steam pumped into the drum and contacted with clothes into water by the heat pump system.

3. A vacuum heat pump clothes dryer using the method for drying clothes with vacuum heat pump according to claim 1, comprising an outer tub, a driving device, and a control device, wherein:
   the dryer also includes a sealed drum, a heat pump system, a vacuum device and a steam generating device,
   the steam generating device connects with the interior of the drum to introduce hot steam into the interior of the drum,
   the vacuum device connects with the interior of the drum,
   the heat pump system is arranged external to the drum,
   the heat generated by the heat pump device is exchanged with the outer surface of the drum through a liquid medium so as to heat wet clothes in the drum, simultaneously damp-hot air mixed with the water vapor pumped from heating clothes in the drum by the vacuum device and the hot steam pumped into the drum and contacted with clothes are cooled and condensed into water,
   the water produced by damp-hot air is connected with water provided by the steam generating device,
   the heat pump system includes a compressor, a condenser, a throttling device and an evaporator,
   a circulatory system is formed via a refrigerant circulating pipeline that connects the compressor, the condenser, the throttling device, the evaporator and the compressor,
   the refrigerant with high temperature and high pressure produced by compression is transferred to the condenser and releases heat through the condenser, the released heat being used to heat the surface of the drum,
   the refrigerant is adjusted by the throttling device to become a gas of low temperature and low pressure, and the gas of low temperature and low pressure passes through the evaporator and exchanges heat with the damp-hot air pumped by the vacuum device in the evaporator, simultaneously the damp-hot air is cooled and condensed into water,
   the drum is arranged inside the outer tub rotationally,
   a space for the liquid medium is set between the lower part of the drum and the outer tub,
   the space for the liquid medium is full of liquid medium, and
   the condenser of the heat pump system is arranged in the space for the liquid medium to release the heat to the liquid medium directly.

4. A vacuum heat pump clothes dryer according to claim 3, wherein the heat released by the heat pump system is absorbed through the circulating water system, the circulating water system allows the liquid medium to circulate in the condenser and liquid media space through the circulating water pipeline and the pump to effect the heat exchange.

5. A vacuum heat pump clothes dryer according to claim 3, wherein the vacuum device includes an injector for pumping negative pressure, a centrifugal pump and a catchment device, a circulatory waterway is formed through the centrifugal pump and connects the injector and the catchment device to the centrifugal pump, the vacuum device includes a vacuum pipe, one end of the vacuum pipe is connected with the drum, and the other end through the evaporator is connected with the injector.

6. A vacuum heat pump clothes dryer according to claim 5, wherein said injector is a venturi tube having an outlet, a side of the venturi tube outlet connects with the vacuum pipe, the circulatory waterway formed through the centrifugal pump connects the injector, the catchment device to the centrifugal pump that pumps air and water in the pipe connecting with the evaporator by the injector, and the other end of that pipe connecting with the evaporator connects with the drum to extract the gas in the drum to reduce the pressure in the drum close to a vacuum, and under a vacuum condition, saturated damp-hot air in the drum is cooled and condensed into water through the evaporator of the vacuum pipe, and the water is collected in the catchment device.

7. A vacuum heat pump clothes dryer according to claim 6, wherein said steam generating device is connected with the drum and the catchment device respectively, a part of the water in the catchment device is circulated in the circulatory waterway, and passed to the steam generating device, and the remaining part is drained.

* * * * *